United States Patent [19]

Sarma

[11] Patent Number: 5,204,659
[45] Date of Patent: Apr. 20, 1993

[54] APPARATUS AND METHOD FOR PROVIDING A GRAY SCALE IN LIQUID CRYSTAL FLAT PANEL DISPLAYS

[75] Inventor: Kalluri R. Sarma, Mesa, Ariz.
[73] Assignee: Honeywell Inc., Minneapolis, Minn.
[21] Appl. No.: 563,675
[22] Filed: Aug. 3, 1990

Related U.S. Application Data

[63] Continuation of Ser. No. 120,553, Nov. 13, 1987, abandoned.

[51] Int. Cl.⁵ .............................................. G09G 3/36
[52] U.S. Cl. .................................... 340/784; 340/793
[58] Field of Search ....................... 340/767, 784, 793; 350/332, 333, 350 S; 359/36, 53, 54, 55, 57, 58, 59

[56] References Cited

U.S. PATENT DOCUMENTS

| | | | |
|---|---|---|---|
| 3,647,958 | 3/1972 | Sobel | 350/333 |
| 4,651,148 | 3/1987 | Takeda et al. | 340/784 |
| 4,655,550 | 4/1987 | Crossland et al. | 340/784 |
| 4,661,809 | 4/1987 | Anderson et al. | 340/793 |
| 4,712,877 | 12/1987 | Okada et al. | 350/333 |
| 4,743,096 | 5/1988 | Wakai et al. | 350/333 |
| 4,747,671 | 5/1988 | Takahashi et al. | 350/350 S |
| 4,761,058 | 8/1988 | Okubo et al. | 340/784 |
| 4,791,417 | 12/1988 | Bobak | 340/793 |

FOREIGN PATENT DOCUMENTS 0293048 11/1988 European Pat. Off. .
2537316 6/1984 France .
62-182718 8/1987 Japan .

OTHER PUBLICATIONS

Paent Abstract of Japan, vol. 10, No. 41 (P-429) (2098) 18 Feb. 1986.
Patent Abstract of Japan, vol. 11, No. 270 (P-611) (2717) 3 Sep. 1987.
W. W. Holloway, Jr. et al., "Dynamic Scattering by a Nematic Liquid Crystal Where the Applied Electric Field is Normal to the Incident Light", Journal of Applied Physics, vol. 42, No. 13, Dec. 1971, pp. 5395-5399.

*Primary Examiner*—Richard Hjerpe
*Attorney, Agent, or Firm*—John G. Shudy, Jr.

[57] ABSTRACT

A liquid crystal display is described that includes gray scale capability. Each pixel of the display is subdivided into a plurality of subpixels. Each subpixel has coupled thereto a thin film transistor, the thin film transistor coupled to the effective subpixel capacitor. The liquid crystal material is contained between the effective capacitor plates. The voltage applied to the effective capacitor resulting from current flowing through the thin film transistor controls the optical activity of the subpixel. By controlling parameters associated with the thin transistor and by controlling the voltage applied to the pixel (and the subpixel thin film transistors), the optical properties of the subpixel can be controlled as a result of the charge applied across the effective capacitor to provide an angular independent gray scale for the pixel.

19 Claims, 8 Drawing Sheets

GRAY LEVEL 2

GRAY LEVEL 4

GRAY LEVEL 6

GRAY LEVEL 8

| $V_D$ | $V_{LC}$ | | | | GRAY LEVEL |
|---|---|---|---|---|---|
| | SUBPIXEL No. 1 L/W=10/69 | SUBPIXEL No. 2 L/W=10/46 | SUBPIXEL No. 3 L/W=10/30 | SUBPIXEL No. 4 L/W=10/20 | |
| 0.00V | 0.00V | 0.00V | 0.00V | 0.00V | 1 |
| 4.01V | 2.54V | 1.68V | 1.11V | 0.74V | 2 |
| 6.07V | 3.83V | 2.54V | 1.68V | 1.11V | 3 |
| 9.16V | 5.78V | 3.83V | 2.54V | 1.68V | 4 |
| 13.8V | 8.73V | 5.78V | 3.83V | 2.54V | 5 |

APPARATUS AND METHOD FOR PROVIDING A GRAY SCALE IN LIQUID CRYSTAL FLAT PANEL DISPLAYS

This is a continuation of copending application Ser. No. 07/120,553 filed on Nov. 13, 1987, now abandoned.

RELATED APPLICATION

The following U.S. patent application is related to the present invention:

APPARATUS AND METHOD FOR PROVIDING A GRAY SCALE CAPABILITY IN A LIQUID CRYSTAL DISPLAY UNIT, invented by Anthony J. Bernot and Michael J. Johnson, having Ser. No. 07/120,456, filed on Nov. 13, 1987 and assigned to the assignee of the present application.

BACKGROUND OF THE INVENTION

1. Field of the Invention

This invention relates generally to devices for visually displaying data and images and, more particularly, to flat planel liquid crystal display devices.

2. Description of the Related Art

Certain materials, generally referred to as liquid crystals, are electro-optic in that an application of a voltage of appropriate magnitude changes the optical properties of light transmitted through the liquid crystal media. This change in the light transmitted through the liquid crystal media has received increasing use as the basis for optical displays. This electro-optic behavior is particularly well suited for active matrix displays where a high impedance solid state switch (such as a thin film transistor or diode) is used to transfer voltage to the liquid crystal capacitor at each pixel of the matrix display. In addition, the liquid crystal display units have a low power requirement, the power being used only to deform the initial orientation of the liquid crystal molecules. Liquid crystal display units can operate in ambient light when a mirror is placed behind the liquid crystal material and the optical properties of the material are used to control the reflected light. The use of ambient light typically requires that the liquid crystal display unit be oriented carefully with respect to the light source. To reduce the orientation problem and to alleviate the requirement for an ambient light, the liquid crystal display panel can be illuminated from the rear. Finally, the liquid crystal display panel can be fabricated to be flat and relatively narrow. With modern technology, the associated circuits can be made to occupy relatively little space within any desired configuration.

Figure 1A:
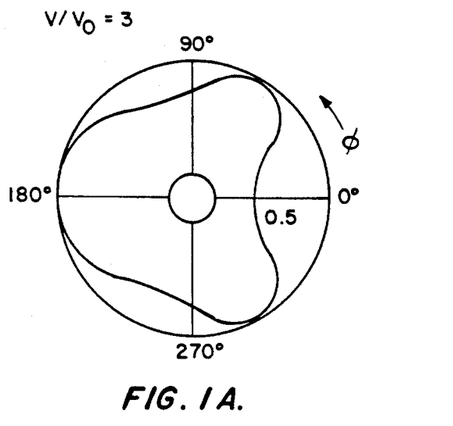
FIG. 1A FIG. 1B, FIG. 1C and FIG. 1D illustrate the angular dependence of the optical transmission for the ratio $V/V_0 = 3$, $V/V_0 = 2$, $V/V_0 = 1.5$, and $V/V_0 = 0$, respectively, where V is the voltage across a liquid crystal cell and $V_0$ is the cell threshold voltage.
Figure 1B:
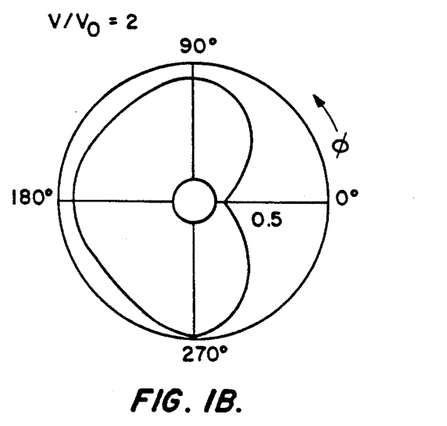
Figure 1C:
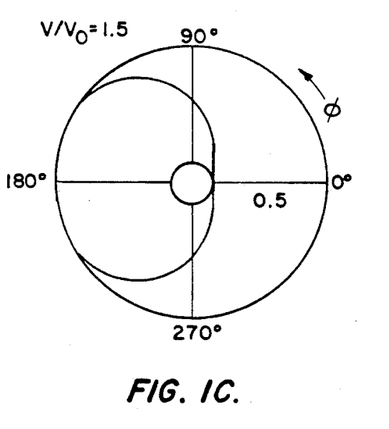
Figure 1D:
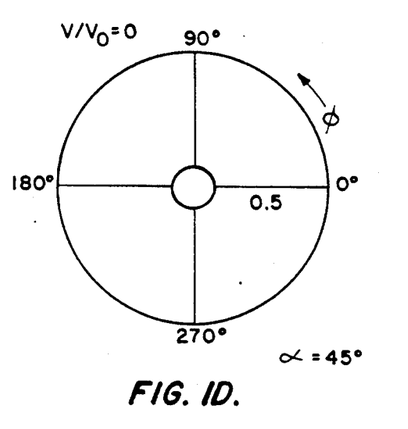
Figure 1E:
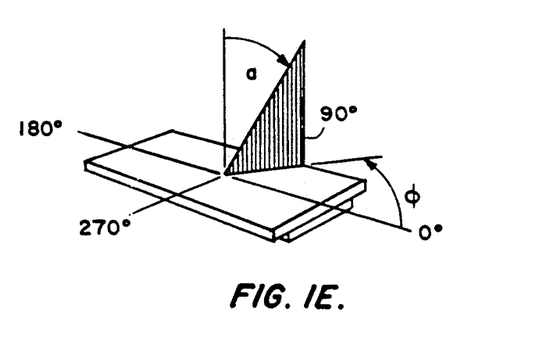
FIG. 1E identifies the parameters of FIG. 1A through FIG. 1D.

However, to the present time, the liquid crystal displays have suffered from the inability to incorporate a satisfactory gray scale capability in the unit. In the past, attempts to achieve a gray scale capability in liquid crystal displays have used the direct approach of dividing each display point, hereinafter referred to as pixel, into a plurality of subunits or subpixels. The number of subunits which are activated provides the gray scale gradations, the eye typically positions at sufficient distance to integrate any image granularity of the pixel. This approach has proven unsatisfactory for two reasons. For any significant number of pixel subunits, the density of address lines is greatly increased with the resulting difficulties in fabrication. In addition, the addressing becomes more difficult because a plurality of subpixels may need to be activated simultaneously for each pixel. Another technique that has been attempted in order to achieve a gray scale is the result of partially deforming the molecular orientation of the liquid crystal material by applying a voltage to the pixel that is greater than the threshold voltage, but less than the voltage for optical saturation. For a twisted nematic liquid crystal display, such a voltage level produces parial deformation of the liquid crystal molecular alignment. However, the partial deformation results in a gray scale which is a function of the viewing angle about an axis perpendicular to the liquid crystal display and, for this reason, has not proven satisfactory. Referring now to FIG. 1, the angular dependence of the transmission of light through a twisted nematic liquid crystal for several applied voltages is illustrated. The applied voltage is stated in terms of the ratio of the applied voltage V to the threshold voltage $V_O$ for $V/V_O = 3$ (FIG. 1A), 2 (FIG. 1B), 1.5 (FIG. 1C) and 0 (FIG. 1D). The angle of viewing (i.e., departure from the axis of the display unit) is 45° and the angle 0 is the angle around the axis (the angles being illustrated in FIG. 1E). The magnitude of transmission is given by the distance from the center (axis) of the FIG. As will be apparent, any attempt to use the applied voltage in a cell containing a twisted nematic liquid crystal to control the gray scale will be unsatisfactory because of the angular dependence of the optical transmission.

A need has therefore been felt for a technique that would provide a gray scale capability for a liquid crystal display unit without the angular dependence associated with prior art liquid crystal display unit gray scale techniques.

FEATURES OF THE INVENTION

It is an object of the present invention to provide an improved display unit.

It is a feature of the present invention to provide an improved liquid crystal display unit.

It is yet another feature of the present invention to provide a liquid crystal display unit having a gray scale capability.

It is still another feature of the present invention to provide a liquid crystal display unit in which each of the pixels include a plurality of subpixels.

It is a further feature of the present invention to provide a liquid crystal display in which the voltage applied to a pixel can control the number of subpixels activated.

It is still a further feature of the present invention to provide a liquid crystal display unit to provide a gray scale that is independent of viewing angle.

It is yet a further feature of the present invention to provide a liquid crystal display unit that has improved gray scale characteristics in response to analog input signals.

It is still a further feature of the present invention to provide gray scale capability for a liquid crystal display unit without additional address lines.

SUMMARY OF THE INVENTION

The aforementioned and other features are accomplished, according to the present invention, by providing a plurality of subpixels associated with each pixel of the display. A thin film transistor is placed in series with each subpixel effective capacitor, the effective capacitor having the liquid crystal material between the plates. The thin film transistors associated with each subpixel have parameters adjusted to control, for a preselected voltage applied to the pixel, the charging and therefore the final voltage applied to the liquid crystal material. By selection of the thin film transistor parameters and the applied voltage levels, the pixel can be provided with gray scale capability in which the liquid crystal material of optically active subpixels is in the saturation state. Because the liquid crystal associated with each subpixel is either unaffected by the applied voltage or else is saturated, the angular homogeneity of the transmitted radiation is greatly improved. The angular homogeneity of the transmitted radiation of the display device to analog signals is also improved.

These and other features of the present invention will be understood upon reading of the following description along with the drawings.

BRIEF DESCRIPTION OF THE DRAWINGS

FIG. 11A illustrates the procedure for designing a liquid crystal pixel cell having subpixel activation determined by the applied voltage level, while

DESCRIPTION OF THE PREFERRED EMBODIMENT

1. Detailed Description of the FIGURES

FIG. 1 has been discussed with reference to the related art.

Figure 2:
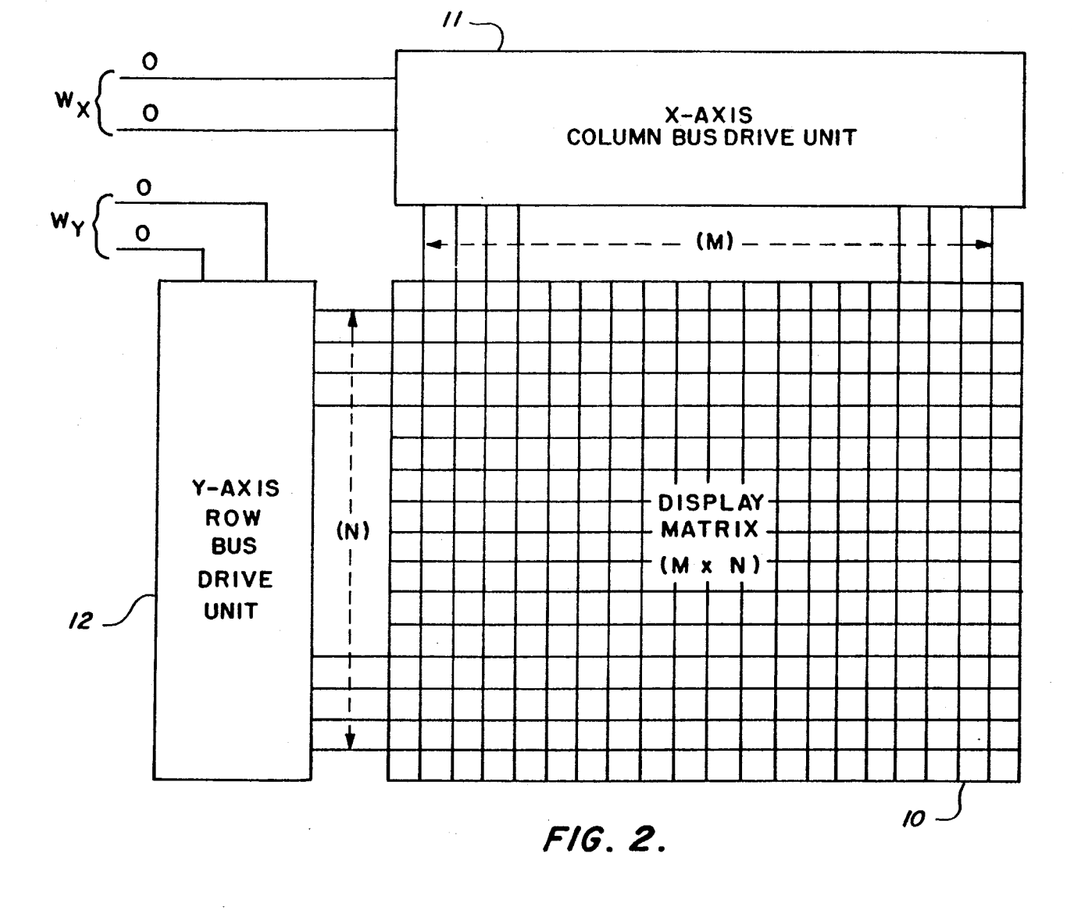
FIG. 2 is a block diagram illustrating the liquid crystal matrix display.

Referring now to FIG. 2, the block diagram of the liquid crystal display matrix is shown. The liquid crystal display 10 has a multiplicity (M×N) of pixels, each pixel being addressed by one of M column conductors and one of N row conductors. The M column conductors are selected by x-axis column bus drive unit 11 in response to groups of address signals, $W_x$, and the N row conductors are selected by y- row bus drive unit 12. The intersection of an activated column conductor and an activated row conductor activates the associated pixel.

Figure 3A:
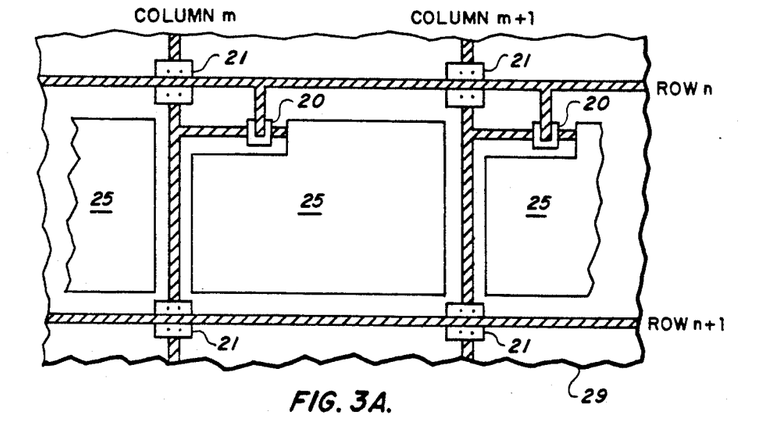
FIG. 3A illustrates the electrical coupling of the column and row conductors to the pixel element and FIG. 3B illustrates the equivalent circuit for the electrical coupling.
Figure 3B:
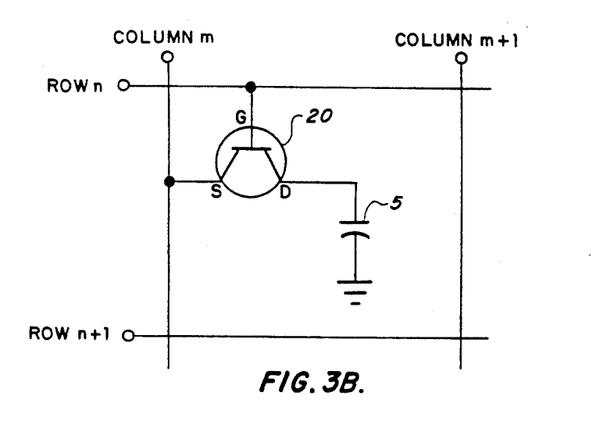

Referring next to FIG. 3A, the coupling of the column and row conductors to the pixel is illustrated. The row and column conductors are deposited on a substrate 29 that forms one surface of the container for the liquid crystal material. The row conductors and the column conductors are separated (electrically) by insulating material pads 21. Fabricated in close proximity to the intersection of a column conductor (m) and a row conductor (n) is a thin film transistor 20. The thin film transistor 20 has a source terminal coupled to the column conductor (m) and the gate terminal coupled to the row conductor (n). The thin film transistor 20 has the drain terminal coupled to conducting material 25 has the drain terminal coupled to conducting material 25 located on the interior surface of the substrate 29 (fabricated from glass in the preferred embodiment). The electric field applied to the liquid crystal pixel (m,n) is the result of the potential difference between the voltage applied to conducting material 25 and the voltage of the common terminal fabricated on the second substrate 32 (shown in FIG. 4) containing the liquid crystal material. The substrate 32, in the preferred embodiment, is a glass material with the common terminal deposited on the interior surface. The equivalent electrical circuit for the pixel is shown in FIG. 3B. The thin film transistor 20 has the source terminal coupled to the column conductor (m) and has the gate terminal coupled to the row terminal (n). The drain terminal of transistor 20 is coupled to capacitance 5. Capacitance 5 is formed by the conducting material 25, the liquid crystal acting as a dielectric material and the ground terminal on the second plate of the liquid crystal display.

Figure 4:
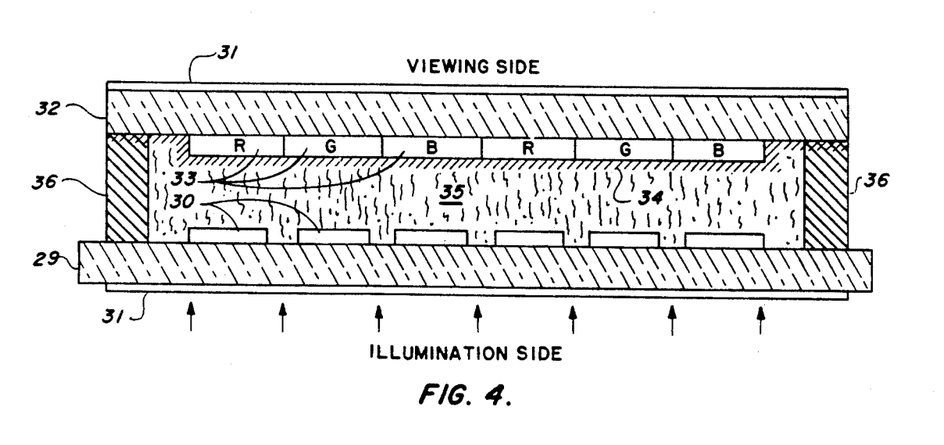
FIG. 4 is a matrix color liquid crystal display capable of using the present invention.

Referring nex to FIG. 4, a color liquid crystal display is shown. Glass substrate 29 has a polarizer 31 associated with the exterior surface of substrate 29 while the interior surface of substrate 29 has electrodes 30 (i.e. the thin film transistors 20 and the conducting material 25 of FIG. 3 as well as the column and row conductors) deposited thereon. The second substrate 32 has a polarizer 31 associated with an exterior surface and has color filters associated with the interior surface. A conducting material 34 which serves as the common electrode is positioned on the interior of glass substrate 32. The filters 33 are positioned on the interior of the glass substrate prior to the conducting material 34. Liquid crystal 35 is placed between the first and second substrate and associated materials, while spacers 36 maintain the inter-substrate distance and contain the liquid crystal.

Figure 5A:
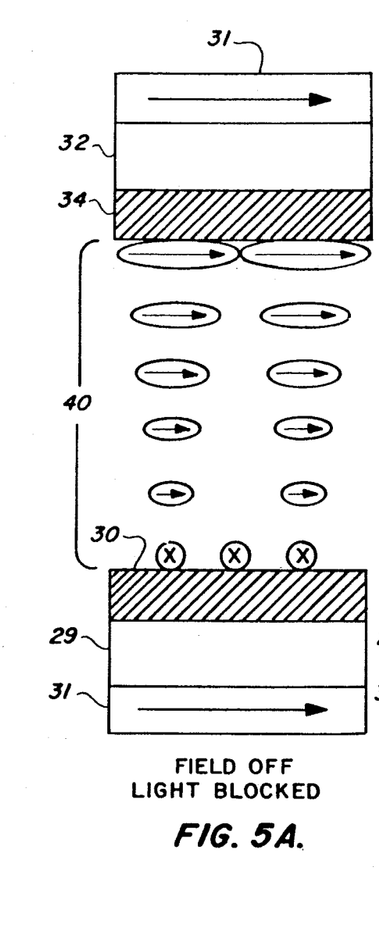
FIG. 5A illustrates the orientation of the liquid crystal molecules with no applied electric field and no optical transmission.
Figure 5B:
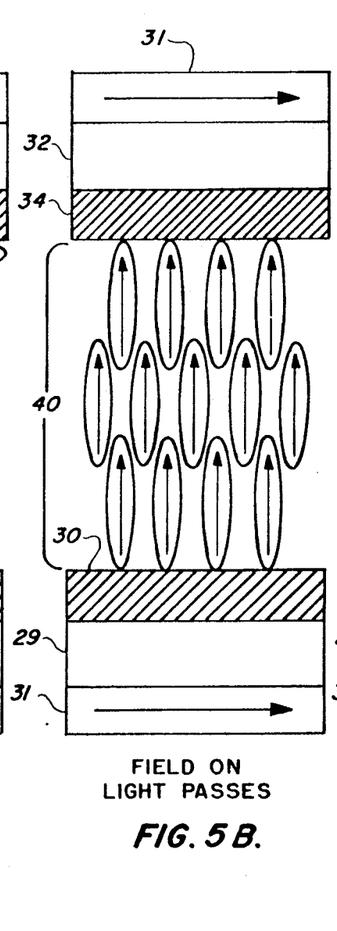
FIG. 5B illustrates orientation of the liquid crystal molecules for an applied electric field resulting in saturation and substantially complete optical transmission; and, FIG. 5C illustrates the orientation of the liquid crystal molecules for far an applied electric field resulting in approximately 50% optical transmission.
Figure 5C:
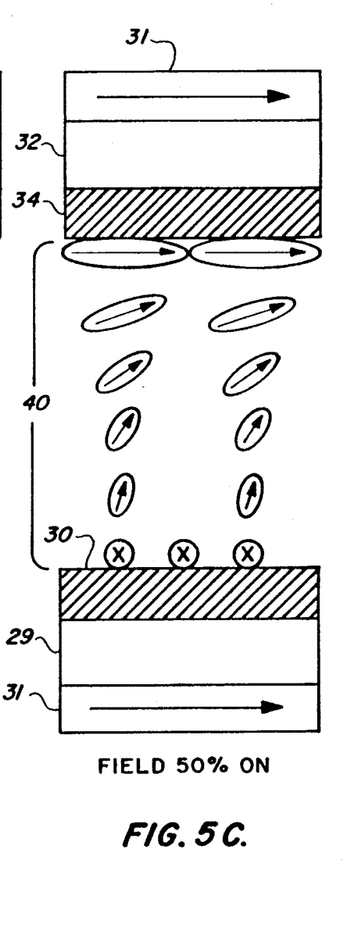

Referring next to FIG. 5, the mode of operation of the liquid crystal display of FIG. 4 using a twisted nematic liquid crystal display, for light transmitted through the display, is shown. In the twisted nematic liquid crystal, the molecules 40 are generally oblong. In FIG. 5A, when the polarizers 31, associated with substrate 32 and 29 respectively, are aligned and no voltage is applied between the electrodes 30 and 34, the molecules of the twisted nematic are generally oriented, along the long axis, parallel to the constraining surfaces. However, the molecules are slightly rotated relative to the nearest neighbors along an axis perpendicular to the constraining surfaces. In this molecular configuration, light polarized by the light polarizer 31 associated with substrate 31 and traveling along the axis perpendicular to the two constraining surfaces will not be transmitted by the polarizer 31 associated with substrate 32. In FIG. 5B, when a sufficiently large voltage is applied between electrodes 34 and 30, the molecules 40 are aligned with the electric field and light can be transmitted through the display. In FIG. 5C, for intermediate fields, the molecules 40 retain the rotational aspects found in the material when no field is applied, partial alignment with the electric field occurs for molecules in the interior of the display. However, as illustrated in FIG. 1, for intermediate fields, the transmitted light is not axially symmetric.

Figure 6:
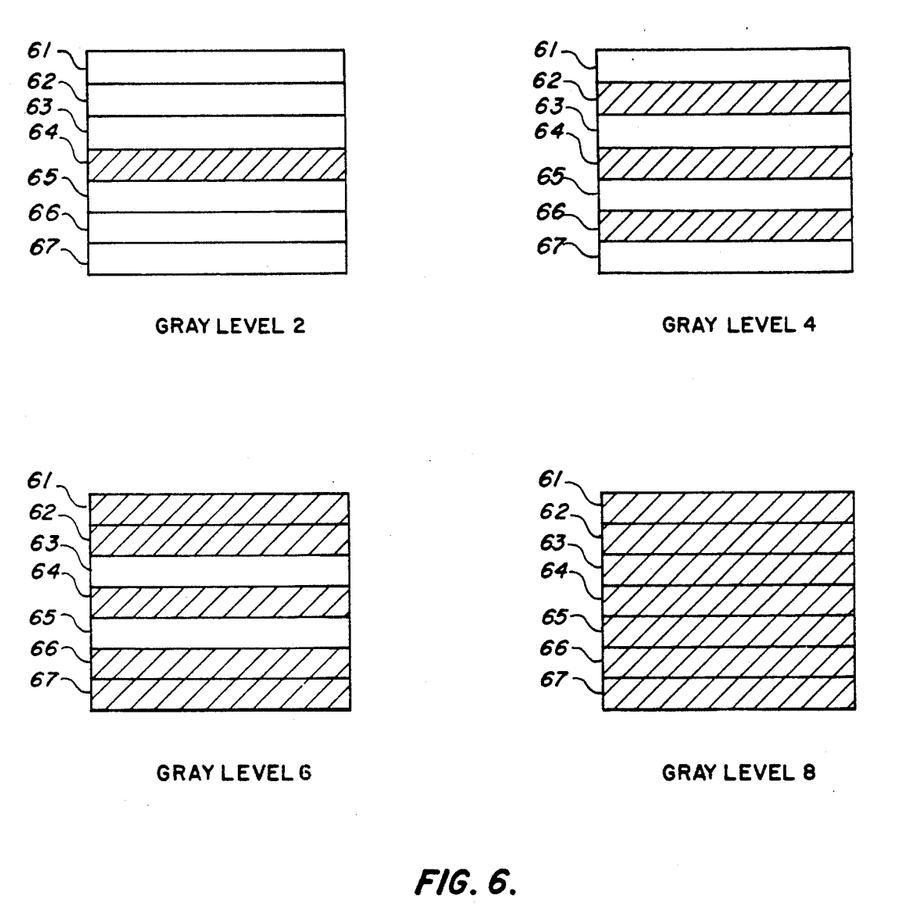
FIG. 6 illustrates how gray scale levels can be achieved by half tone techniques.

Referring next to FIG. 6, the technique for achieving an 8 step gray scale by selectively activating regions of a 7 sector pixel matrix is shown. This technique is shown as the half-tone technique and relies on the integration by the eye when a pixel is sufficiently distant and/or sufficiently small to prevent resolution of the subpixels (or subregions). In gray scale level No. 1 (not illustrated), no portion of the pixel is illuminated (i.e., by transmission of light). In gray scale level No. 2, one pixel subregion has light transmitted through. With each successive gray scale level No., an additional subpixel region has light transmitted therethrough, until, at gray level No. 8, the entire pixel is illuminated by having light transmitted therethrough.

Figure 7:
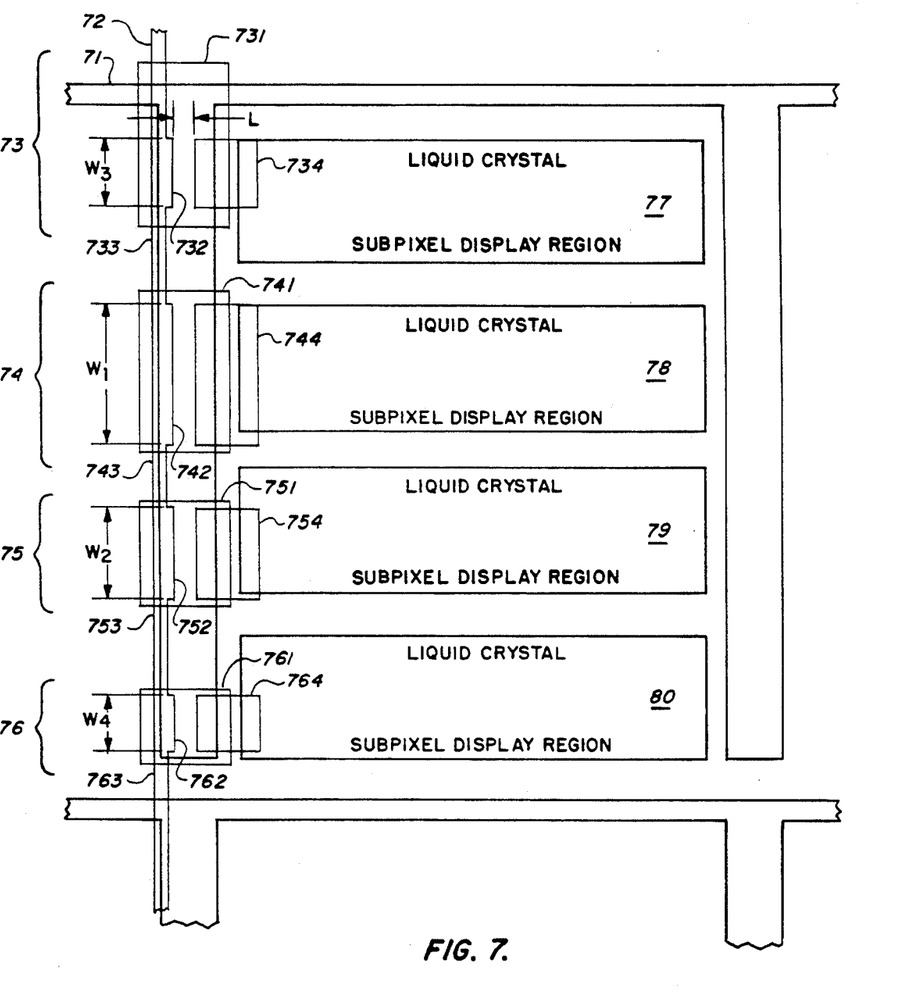
FIG. 7 illustrates the structure of a pixel according to the present invention.

Referring next to FIG. 7, the structure of a liquid crystal display pixel, according to the preferred embodiment is shown. Each liquid crystal subpixel regions 77 through 80 for controlling the transmission of light therethrough. Associated with each liquid crystal subpixel region 77-80 is a thin film transistor 73-76 respectively. Each thin film transistor (73, 74, 75 and 76) has a gate dielectric/semiconductor island (731, 741, 751 and 761) on which the thin film transistor is fabricated. The thin film transistors (73, 74, 75 and 76) each have a source element (733, 743, 753 and 763), a gate element (732, 742, 752 and 762) and a drain element (734, 744, 754 and 764). The drain elements are coupled to the conducting element of the liquid crystal subpixel region that applies voltage to the associated liquid crystal material. The gate elements of the thin film transistors are coupled together by gate bus 71, while the source elements of the thin film transistors are coupled to the source bus 72. The W and L are dimensions that will be described below.

Figure 8:
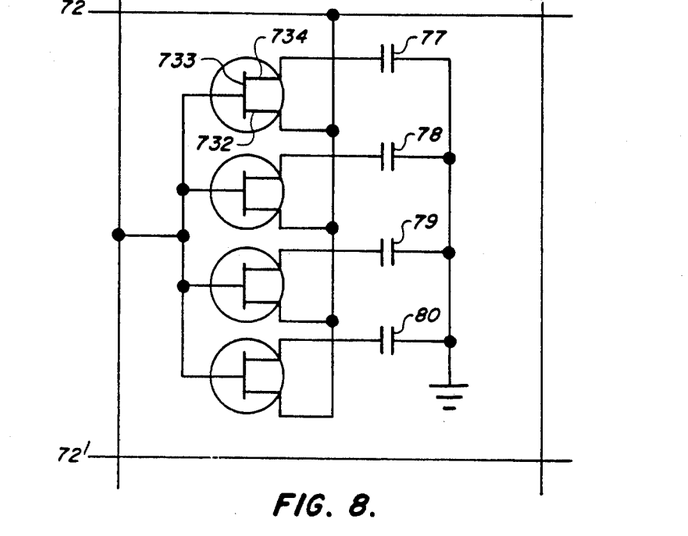
FIG. 8 is an equivalent electrical circuit of the liquid crystal display pixel shown in FIG. 7.

Referring next to FIG. 8, the equivalent electrical circuit of the pixel element, illustrated in FIG. 7, is shown. The liquid crystal subpixel display regions 77, 78, 79 and 80 behave in a manner similar to capacitors. The gate bus 71 provide controllable voltages to the gate terminals of the thin film transistors including the illustrated gate terminal 733. The source bus 72 applies a controllable voltage to the thin film transistors including the illustrated source terminal 732. Finally, the drain terminals of the film transistors are coupled to the associated (liquid crystal display region) capacitor, drain terminal 734 is illustrated as being coupled to capacitor 77.

Figure 9:
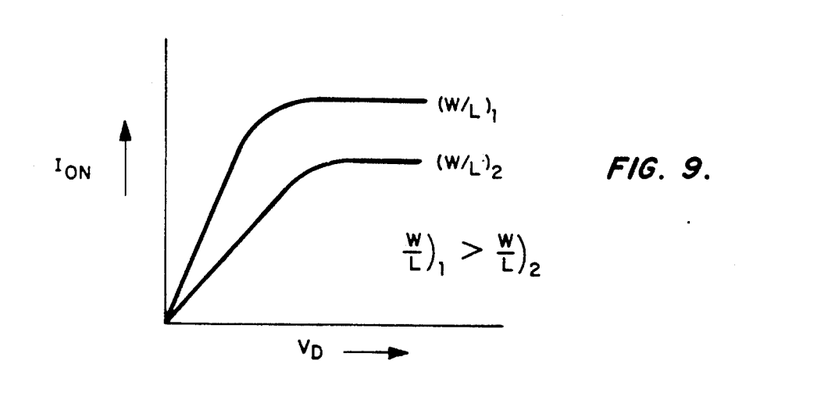
FIG. 9 illustrates the current through the thin film transistor as a function of source-drain voltage.

Referring next to FIG. 9, a graph of the current through the thin film transistor as a function of drain to source voltage is shown. The equations governing this relationship for the linear region $\{V_D < (V_G - V_T)\}$ and for the saturated region $\{V_D > (V_G - V_T)\}$ are exhibited below as equation 1.) and equation 2.) respectively.

Figure 10:
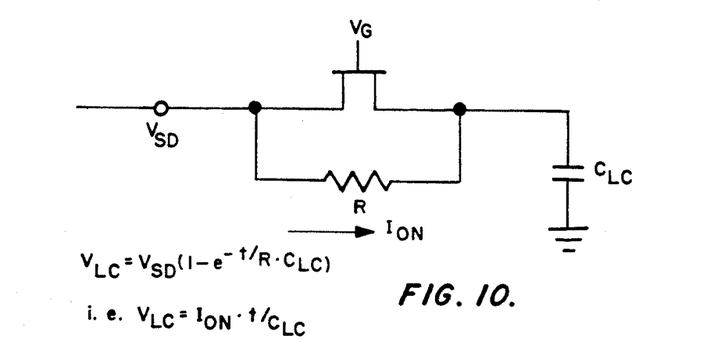
FIG. 10 illustrates the equivalent circuit for the charging of the liquid crystal pixel capacitor.

Referring next to FIG. 10, the equivalent circuit of a thin film transistor and the liquid crystal subpixel display region and the equations governing the charging of the equivalent liquid crystal subpixel display region capacitor ($C_{LC}$) is shown. The voltage $V_{SD}$ is the voltage across the thin film transistor (from the drain terminal to the source terminal).

Figure 11A:
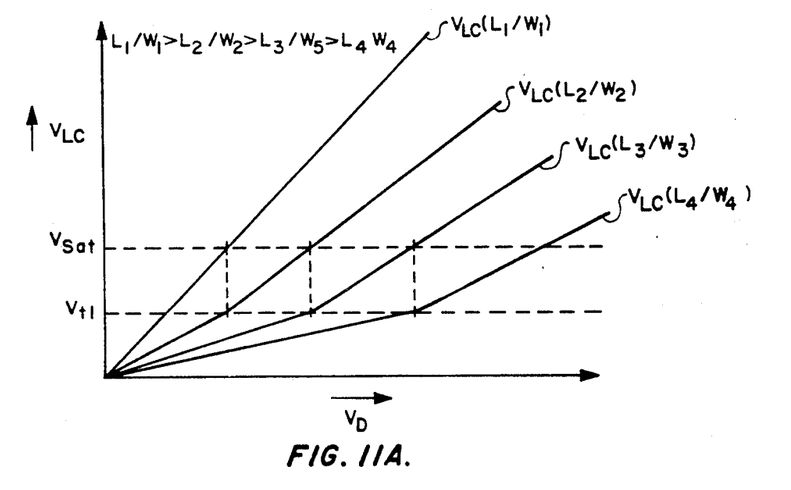
Figure 11B:
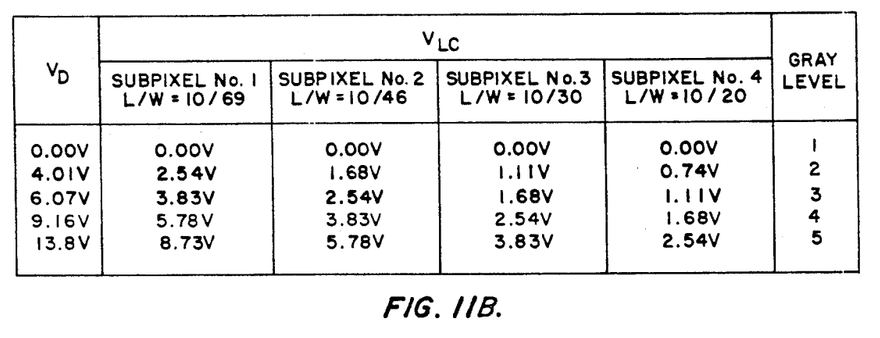
FIG. 11B is a table illustrating the results of an example of designing a liquid crystal according to the present invention.

Referring next to FIG. 11, a graph illustrating the procedure for determining the source-drain voltage $V_D$ to control the gray scale level is shown. In essence, the activation voltage, the L/W (i.e., the length to width ratio of the thin film transistor channel) and the activation time must be chosen so that the voltage across the liquid crystal subpixel display regions (capacitors) to transmit radiation are above the liquid crystal saturation voltage, while the liquid crystal display regions (capacitors) that are to be opaque have a voltage below the threshold voltage level. The illustrative example, shown in the table of FIG. 11B is discussed below.

Figure 12:
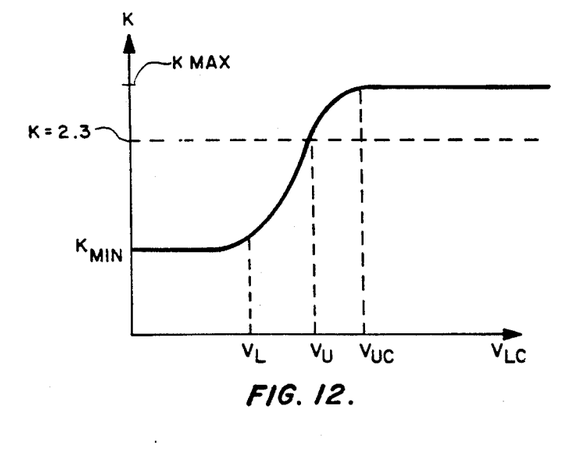
FIG. 12 illustrates a property of liquid crystal materials that effects the structure of the subpixels.

Referring to FIG. 12, the functionality of the dielectric constant for an effective liquid crystal capacitor as a function of applied voltage is illustrated. The relative dielectric constant K has a minimum value that remains essentially constant until the voltage reaches the vicinity of the voltage for optical activation, $V_L$. The relative dielectric constant continues to rise through the voltage level $V_U$ for optical saturation and reaches a maximum value at a voltage level $V_{UC}$ for dielectric saturation. This variation in dielectric constant must be taken into account when establishing the voltage that must be applied to a selected subpixel for optical saturation while the next selected subpixel has a voltage applied thereto that is near the threshold of optical activity.

2. Operation of the Preferred Embodiment

By using thin film transistors having selected characteristics to provide controlled charging, of the pixel capacitor and hence a controlled final voltage across the liquid crystal material, voltages can be chosen so that the voltages across the subpixel are either below the threshold voltage or above the saturation voltage for the liquid crystal material. The capability to apply a controllable voltage to the pixel, along with the capability to control the optical properties of each subpixel as a function of voltage applied to the pixel, permits the liquid crystal display pixels to provide wide viewing angle gray scale capability, i.e., as a function of applied voltage.

The relationship between the parameters of the thin film transistor and the voltage that is applied to the pixel that provides the gray scale capability of the preferred embodiment can be understood as follows. Referring once again to FIG. 9, the current through the thin film transistor is governed by the equations:

$$I_{ON} = u_{fe} * C_i * (W/L) * [(V_G - V_T) * V_D - V^2_D / 2] \quad\quad 1.$$

for $V_D < (V_G - V_T)$ and $$I_{ON} = u_{fe} * C_i * (W/2L) * (V_G - V_T)^2 \quad\quad 2.$$

for $V_D < (V_G - V_T)$ where
 $u_{fe}$ = field effect mobility
 $C_i$ = capacitance per unit length of gate dielectric
 L = channel length
 W = channel widthe
 $v_G$ = gate voltage
 $V_D$ = source - drain voltage, and $V_T$ = threshold voltage.

As will be clear, when all other quantities are held constant, the current through the thin film transistor that charges the liquid crystal subpixel display region capacitor ($=C_{LC}$) varies linearly with the W/L ratio both in the linear region $\{V_D<(V_G-V_T)\}$ and in the saturated region $\{V_D>(V_G-V_T)\}$. Thus, FIG. 9 schematically shows $I_{ON}$ as a function of $V_D$ for a constant $V_G$ for different W/L rations.

Because the currents charging the liquid crystal subpixel display capacitors ($C_{LC}$) are a function of the associated thin film transistor structures, the voltages across the capacitors, as shown in FIG. 10, will be given by the equation:

$$V_{LC} = V_D * (1 - e^{-t/R*C_{LC}}) \qquad 3.$$

where t = the time the associated thin film transistor is activated (conducting)

R = the equivalent resistance of the associated thin film transistor, and $C_{LC}$ = the equivalent capacitance of the associated liquid crystal subpixel display region.

Using the first order approximation, this equation can be written:

$$V_{LC} = I_D * t / C_{LC} \qquad 4.$$

Referring once again to FIG. 11A, the technique for designing a gray scale display as a function of the current through the thin film transistor (actually controlled by the W/L ratio in the thin film transistor) charging the associated capacitor $C_{LC}$ resulting from an applied source to drain voltage $V_D$ is shown. For no pixel subregions to be illuminated (i.e., transmit light), the $V_{th} \geq V(1)_{LC}, V(2)_{LC}, V(3)_{LC}$ and $V(4)_{LC}$. This situation can be created when $V_D \leq V^1_D$. For one subpixel region to be illuminated, then $V(1)_{LC} \geq V_{sat}$ and $V_{th} \geq V(2)_{LC}, V(3)_{LC}$ and $V(4)_{LC}$. For situation can result when $V_D = V^1_{LC}$. Similarly, by choosing the W/L ratios appropriately, a voltage can be determined for which one set of subpixel regions is illuminated while the remaining subpixel regions are opaque. By way of example, the results of which are shown in FIG. 11B, when the liquid crystal material is MERK - ZLI2664 with a threshold voltage $V_{th}$ of 1.68V and a saturation voltage ov $V_{sat}$ of 2.54V. The dielectric constant of this material is 19.1 in the direction parallel to the electric field and is 5.1 in the direction perpendicular to the electric field. The display size is 192 rows by 96 columns with a 60 Hz refresh rate. The capacitance of each subpixel is calculated to be 0.56 pf (picofarads) when the dimensions are 283 um × 67 um. Using a pixel address (charging) time of 142 usec, 0.016 uA would be required to charge a subpixel region to 2.54 V. Using this information and appropriate values for $C_i$ and $u_{fe}$, the minimum W/L ratio is two. The subpixel region is therefore the last region to be turned on. The subpixel with a thin film transistor ratio of 2 requires a pixel voltage of 13.8 V. Using saturation, reaching $V_{sat}=2.58$ V. The next thin film transistor W/L requirement is subject to the condition that the associated subpixel is charged to a voltage greater than the saturation voltage ($V_{sat}=2.54$ V) before the previous voltage reaches the threshold voltage ($V_{th}=1.68$ V). Table 1 sows the results of this type of computation. Thus, when a gray scale of 5 is required, a voltage $V_D=13.8$ V is applied whereas a gray scale of 3 requires a voltage $V_D=6.07$ V. The gate voltage is selected so that the thin film transistor operates in a linear range (i.e., $V_D \leq V_G - V_T$). The calculations and design do not have to be precise with respect to the absolute value of the thin film transistor channel properties. The performance can be optimized by variations in the pixel address (charging) time and the gate voltage, these parameters being held constant after optimization. However, the W/L rations are crucial.

It will be clear that one of the advantages of the present invention is that no additional process steps are required in the fabricaiton of the device, the single thin film transistor being replaced by the plurality of thin film transistors associated with the subpixel region.

In the present invention, the activation of selected subpixels is controlled by introducing a thin film transistor in series with the liquid crystal effective capacitor of the subpixel. The thin film transistor is fabricated to provide a controlled rate of charging of the associated subpixel capacitor compared to the rate of subpixel capacitor charging of the remaining subpixel capacitors. By arranging the thin film transistor properties to provide optical activation of the subpixel liquid crystal material at selected voltages applied to the pixel, a gray scale capability can be obtained as a function of voltage applied to the pixel. The parameters of the thin film transistor that are varied in the preferred embodiment are the width W and the length L of the transistor channel region. In the preferred embodiment, the thin film transistors controlling the application of voltage to each subpixel are fabricated on the substrate using any thin film transistor technology. These transistors can be fabricated using amorphous silicon, polysilicon, cadmium selenide, telurium or other suitable material. The liquid crystal material is selected from a suitable twisted nematic material. However, it will be clear that the approach of the present invention can be used for materials that have an optical activation determined as a function of voltage. The substrate can be fabricated from glass, high temperature glass, quartz or other appropriate material.

When the image to be displayed on the liquid crystal display is stored as a group of logic signals, then a digital to analog converter can be used to obtain the appropriate pixel voltage $V_A$.

Although the present invention has been described with respect to steps in voltage applied to the pixel that eliminates non-optically saturated subpixels, it will be clear that the present invention will increase the uniformity of the light transmission over a wide viewing angle in response to the application of analog signals to the pixel elements of the liquid crystal display unit. This improvement is the result of the fact that, for a plurality of subpixels, an applied analog signal results in only one subpixel not being in a saturated state. Thus, only one subpixel (of the plurality of subpixels) will have an optical transmission with appreciable angular dependence. Therefore, the angular dependence will be less apparent, being superimposed on an optical transmission without appreciable angular dependence. Therefore, the angular dependence will be less apparent, being superimposed on an optical transmission without appreciable angular dependence. Similarly, a gray scale pixel element can be created by using the techniques described in the present invention by creating a sequence of subpixels for each pixel that achieve optical saturation at different voltages, but not necessarily having the relationship shown in FIG. 11A. When the pixel typically has a plurality of subpixels in a state of optical transmission saturation, the uniformity of the axial optical transmission will be improved.

The foregoing description is included to illustrate the operation of the preferred embodiment and is not meant to limit the scope of the invention. The scope of the invention is to be limited only by the following claims. From the foregoing description, many variations will be apparent to those skilled in the art that would yet be encompassed by the spirit and scope of the invention.

What is claimed is:

1. A pixel element of a liquid crystal display, each pixel element comprising:
   a plurality of subpixel elements, each subpixel element having approximately an equal area, each subpixel element including;
   a first and a second conducting region forming plates of a capacitor, said capacitor applying an electric field to a liquid crystal material between said plates when a charge is stored on said plates; and
   an active element, said active element having an output terminal coupled to a first conducting region of said subpixel capacitor;
   wherein all active elements of a pixel have a common activation voltage and a common control voltage applied thereto, each active element of said each subpixel element having preselected parameters for charging each coupled capacitor at a different rate, a gray scale resulting from differential charging of each subpixel capacitor of said each pixel element being a function of a voltage magnitude of said common activation voltage applied to said subpixel active elements during a presence of said common control voltage, a number of subpixel elements for which liquid crystal material associated therewith is optically saturated being a function of said voltage magnitude.

2. The liquid crystal pixel element of claim 1 wherein said liquid crystal display is a matrix display, said each pixel element being activated by simultaneous signals on a column conductor and a row conductor, wherein control terminals of subpixel active elements of said each pixel element are coupled to a row conductor associated with a matrix location of said each pixel element, activation terminals of said each pixel element coupled to a column conductor associated with said each pixel element matrix location.

3. The liquid crystal pixel element of claim 1 wherein said common control voltage for said each pixel has a preestablished duration, said each active element charging said coupled capacitor during an application of said control signal at a rate determined by said active element preselected parameters and said voltage magnitude.

4. The liquid crystal pixel element of claim 3 wherein said active elements are thin film transistors having drain terminals coupled to said subpixel capacitors, said each subpixel active element having a different preselected geometric structure, said preselected geometric structure controlling a current flowing through said thin film transistors during a presence of said common control voltage, wherein a current flowing through each thin film transistor has a predetermined relationship with current flowing through other thin film transistors of said pixel having said common control voltage applied thereto.

5. The liquid crystal pixel element of claim 1 wherein optical saturation of said each subpixel element of a pixel occurs in sequence as a function of voltage magnitude, wherein a liquid crystal material of a selected subpixel element generally reaches optical saturation in response to a voltage magnitude applied to said each pixel element when a liquid crystal material of a next sequential subpixel element in said sequence has substantially no optical activation in response to application of said voltage magnitude and said common control voltage.

6. The liquid crystal pixel element of claim 1 wherein liquid crystal material of said each subpixel reaches optical saturation in response to application of said common control voltage and a different voltage magnitude, said different voltage magnitudes resulting in a pixel element gray scale.

7. The method of implementing a gray scale for a pixel element in a liquid crystal display comprising the steps of:
   dividing said pixel element into a plurality of subpixel regions having substantially equal optical viewing areas, each of said subpixel regions including a region of liquid crystal material between optically transmitting conduction plates, said conducting plates forming a subpixel capacitor, all of said subpixel capacitors having substantially equal capacitances;
   fabricating a thin film transistor in each subpixel region, said thin film transistors having substantially equal threshold voltages;
   coupling an output terminal of each of said thin film transistors to a first conducting plate of a subpixel capacitor in a region including said thin film transistor;
   coupling input terminals of said thin film transistors of a pixel element to a one of a first multiplicity of conducting leads, said first multiplicity of conducting leads having signals related to a display image applied thereto;
   coupling control terminals of said thin film transistors of a pixel element to a one of a second multiplicity of conducting leads, said second multiplicity of conducting leads having signals related to pixel activation coupled thereto; and
   selecting parameters of each of said thin film transistors of each pixel element to provide differential charging of said coupled pixel element subpixel capacitor, each subpixel capacitor being charged during application of a control signal to said control terminals at a different rate determined by a magnitude of a voltage applied to said input terminals and said thin film transistor parameters, said equal area subpixel capacitor differential charging providing a subpixel gray scale determined by a different optical saturation voltage for each subpixel.

8. The method of implementing a gray scale liquid crystal display pixel of claim 7 wherein said selecting step includes selecting said thin film transistor parameters wherein, for application of a control signal of predetermined duration and application of an image signal of preselected magnitude, a first subpixel capacitor has a charge stored thereon causing said liquid crystal material to become optically saturated when a charge stored on a next sequential subpixel capacitor results in insignificant optical activity for said capacitor.

9. The method of implementing a gray scale liquid crystal display of claim 7 wherein said selecting step includes the step of selecting width to length ratios for channel regions of said subpixel thin film transistors, said rations for channel regions providing parameters resulting in said differential charging.

10. The method of implementing a gray scale liquid crystal display of claim 7 wherein said selecting step further includes, the step of adjusting parameters of each subpixel thin film transistor to provide only one optically unsaturated subpixel region for each optically activated pixel.

11. A liquid crystal display comprising:
a first multiplicity of conducting leads;
a second multiplicity of conducting leads;
a multiplicity of display pixel elements, each of said pixel elements coupled to a one of said first multiplicity of conducting leads and to a one of said second multiplicity of conducting leads, each of said pixel elements including;
a plurality of subpixel elements, each of said subpixel elements having,
a liquid crystal material,
a first and a second optically transmitting and electrically conducting plate on a first and second side of said liquid crystal material for providing a subpixel capacitor, each of said subpixel capacitors having substantially equal capacitances; and
an active element having an output terminal coupled to said each subpixel capacitor, each active element of a pixel having an input lead coupled to said one of said first multiplicity of conducting leads, each active element of a pixel having a control terminal coupled to said one of said second multiplicity of conducting leads, each of said active elements having a substantially equal threshold voltage, wherein a control signal applied to said active element control terminal causes a charging of said coupled subpixel capacitor at a rate determined by a magnitude of an input voltage applied to said active element input lead and parameters of said active element, wherein each active element has different parameters, wherein a magnitude of an input signal applied to said pixel element along with a control signal and parameters of said pixel active elements result in a difference in charge stored on each subpixel capacitor, said difference in charge providing a gray scale for each pixel element by controlling a voltage across each subpixel capacitor, said gray scale determined by a saturation voltage for each subpixel capacitor.

12. The liquid crystal display of claim 11 wherein said pixel element gray scale is provided by selecting said parameters and a duration of said control signal to cause optical saturation for a first subpixel liquid crystal for a first range of input voltages, a second range of input voltages causing said first subpixel and a second subpixel liquid crystal material to be optically saturated, a third range of input voltages causing liquid crystal material of said first and said second subpixel liquid crystal material and a third subpixel liquid crystal material to become optically saturated.

13. The liquid crystal display of claim 12 wherein said liquid crystal display is a matrix display, each of said first multiplicity of conducting leads being coupled to a column of display pixel elements, each of said second multiplicity of conducting leads being coupled to a row of pixel elements.

14. The liquid crystal display of claim 12 wherein said active elements are thin film transistors, said control terminal of said active element being a gate terminal of a thin film transistor.

15. The liquid crystal display of claim 12 wherein a charge on a subpixel capacitor is determined by a voltage applied to said input terminal, parameters of said active element, and a duration of a control signal applied to said control terminal; a subpixel capacitor charge determining an electric field applied to liquid crystal material associated with said subpixel capacitor.

16. The liquid crystal display of claim 14 wherein said active element parameters are determined by a ratio of a width to length of a channel region for each subpixel thin film transistor, wherein said active element parameters determine a differential charging for coupled subpixel capacitors of a pixel element.

17. The liquid crystal display of claim 13 wherein, for display of an image, each pixel element is addressed by simultaneous application of an image signal to said one of said first multiplicity of conducting leads and application of a control voltage to said one of said second multiplicity of conducting leads, wherein each subpixel capacitor of a pixel element is charged at a different rate.

18. The liquid crystal display of claim 16 wherein and active element input terminal is a source terminal of a thin film transistor.

19. The liquid crystal display of claim 11 wherein said liquid crystal material is twisted nematic liquid crystal, a voltage applied to said input terminal and a control voltage applied to said control terminal of a pixel element for a preselected time resulting in at most one subpixel transmitting optical radiation while not being optically saturated, said liquid crystal display providing increased axial uniformity of the transmitted radiation through a subpixel element.

* * * * *

UNITED STATES PATENT AND TRADEMARK OFFICE
CERTIFICATE OF CORRECTION

PATENT NO. : 5,204,659
DATED : April 20, 1993
INVENTOR(S) : Kalluri R. Sarma

It is certified that error appears in the above-indentified patent and that said Letters Patent is hereby corrected as shown below:

Column 10, line 68, after "said" insert --next sequential subpixel--.

Column 12, line 43, cancel "and" and insert --an--.

Signed and Sealed this

Eighteenth Day of October, 1994

Attest:

BRUCE LEHMAN

*Attesting Officer*  *Commissioner of Patents and Trademarks*